Patented June 2, 1925.

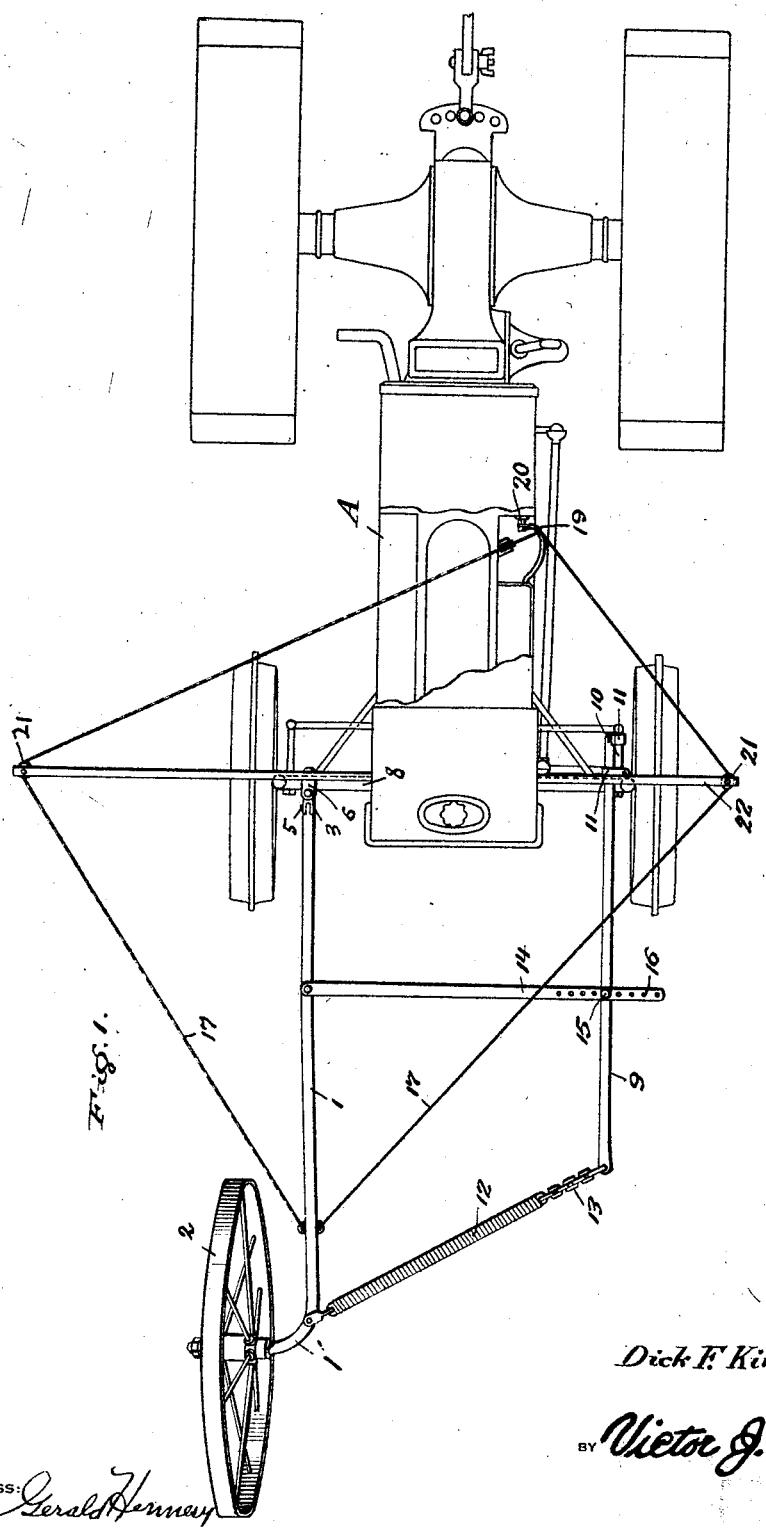

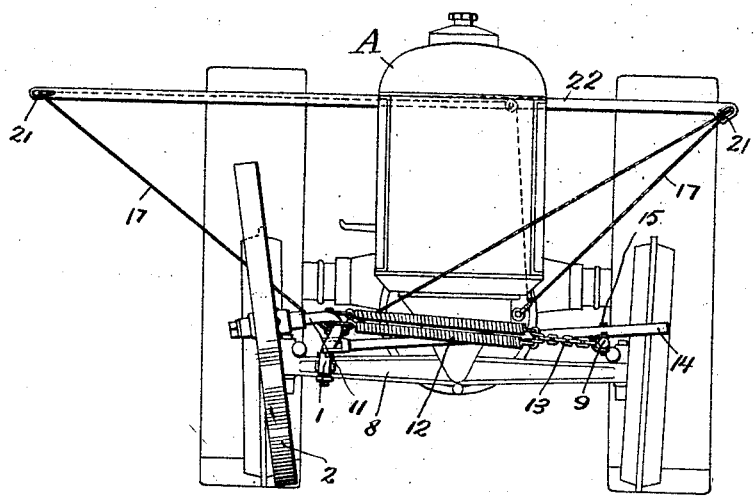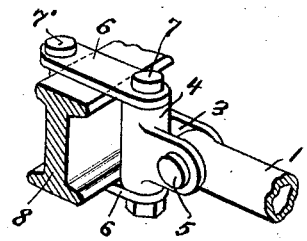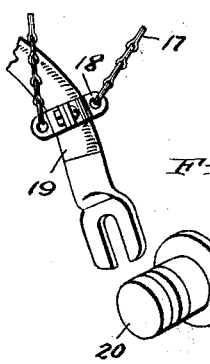

1,540,634

UNITED STATES PATENT OFFICE.

DICK F. KIRCHHOFF, OF ATHOL, KANSAS.

TRACTOR ATTACHMENT.

Application filed December 3, 1924. Serial No. 753,700.

*To all whom it may concern:*

Be it known that I, DICK F. KIRCHHOFF, a citizen of the United States, residing at Athol, in the county of Smith and State of Kansas, have invented new and useful Improvements in Tractor Attachments, of which the following is a specification.

This invention relates to an attachment for a tractor, the general object of the invention being to provide means for steering the tractor automatically by providing it with a furrow engaging wheel which is attached to the steering mechanism of the tractor in such a manner that it will cause the tractor to follow the furrow, a spring being provided for holding the wheel in the furrow.

Another object of the invention is to provide means for breaking the ignition circuit if the wheel of the attachment should leave the furrow.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a view of a tractor with the improvement thereon.

Figure 2 is a front view of Figure 1.

Figures 3 and 4 are detail views.

In these views, 1 indicates a rod, which may be formed of tubing and which has one end curved outwardly, as at 1′, with its extremities forming a spindle for a wheel 2 which is suitably held on the spindle in any desired manner. The spindle is held at such an angle that the wheel is slightly tilted from the vertical as shown in Figures 1 and 2. The other end of the rod 1 is pivoted between the ears 3 of a sleeve 4 by a pin 5 so that it can be swung about a horizontal axis and the sleeve is moved about a vertical axis by being held between a pair of plates 6 by a bolt 7, this bolt and a bolt 7′ holding the plates 6 in clamping engagement with the front axle 8 of a tractor, such as shown at A. A second rod 9, which may also be formed of tubing, is clamped to one of the arms 10 of the steering mechanism of the tractor by the clips 11 and the outer end of this rod 9 is connected with the outer part of the rod 1 by means of the spring 12 and the chain 13. A cross rod 14 is pivoted to the rod 1 and is adjustably connected with the rod 9 by means of the bolt 15 which passes through any one of a number of holes 16 formed in the rod 14.

From the foregoing it will be seen that when the wheel 2 has been placed in a furrow the spring 12 will tend to hold it against the wall of the furrow so that the wheel will follow the furrow as the tractor is moving and said wheel will thus steer the tractor through means of the frame formed of the connecting rods. Thus the tractor is self-steering and will plow a field around which a furrow has been made with but little attention on the part of the operator.

In order to stop the tractor if the wheel should happen to leave the furrow I connect a pair of chains 17 with the rod 1 and connect the other ends of these chains to a clip 18 which is fastened to one of the terminals 19 of the ignition circuit, the terminal having a forked connection with its stud 20, as shown in Figure 4, so that when the rod 1 is moved a distance to the right or left by the wheel leaving the furrow the pulley on the chain will jerk the terminal 19 from its stud 20 and thus break the ignition circuit and bring the tractor to rest. The chains pass over guiding pulleys 21 which are carried by the bars 22, fastened to the tractor and extending beyond the sides thereof.

From the foregoing it will be seen that I have provided simple means for making a tractor self-steering with means for stopping the tractor if the wheel of the steering device should leave a furrow.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a tractor, a frame connected with the front thereof and with a part of the steering mechanism thereof, a wheel carried by the frame and adapted to engage a furrow, spring means for holding the wheel in the furrow, and means for breaking the ignition circuit if the wheel should leave the furrow.

2. In combination with a tractor, a bar hingedly connected with the front axle thereof, a spindle at the front end of the bar and extending at right angles therewith, a wheel carried by the spindle, a second bar clamped to one of the steering arms of the steering mechanism of the tractor, spring means for connecting the front ends of the bars together and a cross bar pivotally connected with one bar and adjustably connected with the other bar.

3. In combination with a tractor, a frame connected with the front thereof, and with a part of the steering mechanism, a furrow engaging wheel carried by the frame, a flexible member connected with one of the terminals of the ignition circuit of the tractor and with a part of the frame so that the shifting of the frame will detach the terminal and thus break the ignition circuit.

In testimony whereof I affix my signature.

DICK F. KIRCHHOFF.